(12) United States Patent
Duge (10) Patent No.: US 11,149,639 B2
(45) Date of Patent: Oct. 19, 2021

(54) SYSTEMS AND METHODS OF REDUCING DISTORTIONS OF THE INLET AIRFLOW TO A TURBOMACHINE

(71) Applicant: Rolls-Royce North American Technologies Inc., Indianapolis, IN (US)

(72) Inventor: Robert T. Duge, Carmel, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 719 days.

(21) Appl. No.: 15/363,654

(22) Filed: Nov. 29, 2016

(65) Prior Publication Data
US 2018/0149084 A1 May 31, 2018

(51) Int. Cl.
*F02C 7/057* (2006.01)
*F02C 7/055* (2006.01)
(Continued)

(52) U.S. Cl.
CPC .............. *F02C 7/057* (2013.01); *F02C 7/042* (2013.01); *F02C 7/055* (2013.01); *F02K 3/00* (2013.01); *F02C 7/04* (2013.01); *F05D 2300/505* (2013.01)

(58) Field of Classification Search
CPC .. F02C 7/04; F02C 7/042; F02C 7/055; F02C 7/057; F05D 2300/505; B64D 33/02
See application file for complete search history.

(56) References Cited

U.S. PATENT DOCUMENTS 2,735,612 A * 2/1956 Hausmann .............. F01D 5/143
415/208.1
5,448,881 A * 9/1995 Patterson ................ F02C 7/057
415/26

(Continued)

FOREIGN PATENT DOCUMENTS

GB 1543584 4/1979

OTHER PUBLICATIONS

Berrier, Bobby, and Brian Allan. "Experimental and computational evaluation of flush-mounted, S-duct inlets." 42nd AIAA aerospace sciences meeting and exhibit. 2004. (Year: 2004).*
(Continued)

*Primary Examiner* — Jason H Duger
*Assistant Examiner* — Thomas P Burke
(74) *Attorney, Agent, or Firm* — Barnes & Thornburg LLP (57) ABSTRACT

Systems and methods of conditioning inlet air flow in a turbine engine. Where distortions in uniformity of inlet air flow are caused at least in part by the interaction of the air flow with the air inlet duct, a method of adaptively removing the distortions prior to the compressor stage comprises determining the distortion in the airflow; exposing the airflow to a plurality of correction vanes; and positioning the plurality of correction vanes based at least upon the determined distortion. An inlet conditioner system comprises an adaptable conditioning grid located within an air passage; a sensor suite configured to sense a characteristic of the airflow within the air passage; and a control system operably connected to the sensor suite and the adaptable conditioning grid. The control system may be adapted to configure the adaptable conditioning grid based on a sensed characteristic.

7 Claims, 11 Drawing Sheets

(51) Int. Cl.
*F02C 7/042* (2006.01)
*F02K 3/00* (2006.01)
*F02C 7/04* (2006.01)

(56) References Cited

U.S. PATENT DOCUMENTS

| | | | |
|---|---|---|---|
| 6,089,505 A | 7/2000 | Gruensfelder et al. | |
| 6,371,414 B1* | 4/2002 | Truax | B64C 23/06 |
| | | | 138/38 |
| 6,959,552 B2 | 11/2005 | Leblanc | |
| 8,240,616 B2* | 8/2012 | Miller | B64C 21/04 |
| | | | 244/130 |
| 9,145,198 B1 | 9/2015 | Shome et al. | |
| 9,194,301 B2 | 11/2015 | Parente | |
| 10,006,833 B1* | 6/2018 | Caldwell | G01M 15/14 |
| 2003/0059291 A1 | 3/2003 | Koshoffer | |
| 2007/0110583 A1* | 5/2007 | McMillan | F01D 5/147 |
| | | | 416/229 R |
| 2007/0241229 A1* | 10/2007 | Silkey | F02C 7/057 |
| | | | 244/53 A |
| 2007/0295860 A1* | 12/2007 | Gustafsson | B64D 33/04 |
| | | | 244/73 R |
| 2008/0164378 A1* | 7/2008 | Owens | B64D 33/02 |
| | | | 244/53 B |
| 2009/0297334 A1 | 12/2009 | Norris | |
| 2011/0011055 A1* | 1/2011 | Troy | F02C 7/055 |
| | | | 60/39.092 |
| 2013/0074512 A1* | 3/2013 | Tillery | F01D 17/141 |
| | | | 60/773 |
| 2013/0319009 A1* | 12/2013 | Parente | F02C 7/057 |
| | | | 60/805 |
| 2013/0343864 A1* | 12/2013 | Morford | F02C 7/04 |
| | | | 415/1 |
| 2015/0330310 A1* | 11/2015 | deGaribody | G01S 17/58 |
| | | | 701/100 |
| 2016/0012159 A1* | 1/2016 | Ferrar | G06F 30/20 |
| | | | 703/1 |
| 2016/0069275 A1 | 3/2016 | Lecordix | |
| 2016/0102611 A1 | 4/2016 | Snyder | |
| 2017/0218841 A1 | 8/2017 | Nestico | |

OTHER PUBLICATIONS

Anderson, Bernhard H., and James Gibb. "Study on vortex generator flow control for the management of inlet distortion." Journal of Propulsion and Power 9.3 (1993): 422-430. (Year: 1993).*

* cited by examiner

SYSTEMS AND METHODS OF REDUCING DISTORTIONS OF THE INLET AIRFLOW TO A TURBOMACHINE

FIELD OF THE DISCLOSURE

The disclosed subject matter relates generally to turbomachines, and more specifically to an airflow control device for reducing airflow distortions at the inlet of a turbomachine.

BACKGROUND

Turbomachines convert chemical energy into rotational energy that can be used in a wide range of applications. A gas turbine is one of many different types of turbomachines. A gas turbine comprises a rotatable shaft and a plurality of blades. In some applications at least some of the plurality of blades may comprise a fan. Some examples of types of gas turbines include turbofan, turbojet, turboshaft and turboprop engines. Other types of turbomachines include, inter alia, water turbines, steam turbines and wind turbines.

As one example, turbomachines are used to provide propulsion to some aircraft. A typical turbine engine comprises an inlet, a compressor (which may include a high and low pressure compressor), a combustor, a turbine (which may comprise a high-pressure turbine and a low-pressure turbine), and an outlet.

It is desirable to achieve a uniform airflow at the inlet of a turbomachine. Airflow distortions—which lead to the creation of non-uniformity of airflow—may be caused by, for example, the air passing through an inlet duct prior to entering the inlet of the turbomachine, movement of the turbomachine relative to a column of air, the presence of objects such as, e.g., a runway near to an airframe carrying the turbomachine, the airframe itself, an engine casing or housing, or a combination of these items. Non-uniform airflow may lack uniformity in the radial, circumferential, axial, or any combination of these directional pressure and velocity fields in the turbomachine. In turn, the non-uniform pressure and velocity fields may reduce the efficiency of the turbomachine.

Ideally, the flow conditions encountered by a blade would not change with engine operation, along the circumference through which the blade travels, or both. However, designers, knowing that these conditions will change, will design a blade for a range of flow conditions under which the turbomachine must operate. Even with these range of conditions in mind, the particular flow conditions encountered by the blade at one location may differ from the flow conditions at another location located along the circumference through which the blade travels. Both of these conditions may vary from the ideal conditions for which the blade was optimally designed. Flow distortions are typically detrimental to turbomachine performance and are thus advantageously avoided.

It is therefore desired in the art to have improvements that increase the predictability and uniformity of airflow into, through, and out of a turbomachine to reduce or eliminate asymmetries and flow distortions and thus improve turbomachine efficiency.

SUMMARY

According to an aspect of the disclosed subject matter, a method of adaptively removing the air flow distortions prior to a compressor stage of a turbine engine is provided. The turbine engine may have an air inlet duct prior to the compressor stage. Airflow distortions are caused at least in part by the interaction of the air flow with the air inlet duct. The steps of the method may comprise determining the distortion in the airflow, positioning a plurality of correction vanes based at least upon the determined distortion, and exposing the airflow to the plurality of correction vanes. The plurality of correction vanes may comprise a plurality of shape memory materials. The step of positioning the plurality of correction vanes may comprise applying an electrical current to at least one respective correction vane of the plurality of correction vanes. The application of electrical current transitions the respective correction vane from a first state to a second state. In some embodiments, the step of positioning the plurality of correction vanes may comprises heating the vanes by aerothermal heating.

In accordance with an aspect of the disclosed subject matter, a turbine inlet duct is presented. The inlet duct may comprise an air passage and a conditioning grid. The air passage may be defined by the inlet duct of the turbine and may have a center path defining the airflow through the inlet duct. The center path comprises at least one curve. The conditioning grid may have a plurality of vanes located with the passage. The at least one curve is positioned upstream of the conditioning grid. Each of the plurality of vanes are configured to alter the air flow downstream of the at least one curve.

According to an aspect of the disclosed subject matter, an inlet conditioner system is presented. The inlet conditioner system may comprise a serpentine inlet defining an air passage, an adaptable conditioning grid, a sensor suite and a control system. The adaptable conditioning grid may be located with the air passage and may be operable upon an airflow within the air passage. The sensor suite may be located within the serpentine inlet and may be configured to sense a characteristic of the airflow within the serpentine inlet. The control system may be operably connected to the sensor suite and the adaptable conditioning grid and may be adapted to configure the adaptable conditioning grid based on the sensed characteristic.

BRIEF DESCRIPTION OF THE DRAWINGS

The following will be apparent from elements of the figures, which are provided for illustrative purposes and are not necessarily to scale.

While the disclosed subject matter is susceptible to various modifications and alternative forms, specific embodiments have been shown by way of example in the drawings and will be described in detail herein. It should be understood, however, that the disclosed subject matter is not intended to be limited to the particular forms disclosed. Rather, the disclosed subject matter covers all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments in the drawings.

As used herein, a turbomachine is understood to reference any machine using a turbine including gas turbine engines, wind turbines, steam turbines, water turbines, and the like. A turbomachine comprises at least a rotatable shaft and a plurality of blades.

The disclosed subject matter is directed to a control device for controlling the airflow at the inlet of a turbomachine, such as, e.g., a compressor of a turbine engine, and other applications in a turbomachine which are susceptible to detrimental flow distortions. For example, the disclosed subject matter may control the mixing of one or more internal airflows (e.g., the fan bypass flow and engine core flow), or control an airflow before or after it is divided (e.g., the diving of the fan air flow into a bypass flow and core flow), as a well as airflow(s) exiting or mixing at the exit to the turbomachinery. As will be appreciated by one a skill in the art, the disclosed subject matter may be applicable to correcting any airflow within a turbomachine.

Various components of a turbine engine—such as the vanes and blades of a compressor—are designed based on anticipated velocity vectors and airflow pressures that may encompass a range of values. For example, a rotating blade of a fan or compressor is designed based on a particular set of inlet air velocity vectors and pressures; the compressor and turbine blades and other components of a turbomachine are designed to function with the resultant internal airflows which occur over the range of the design inlet air velocity vectors and pressures.

Designing these compressor or turbine blades to function efficiently over a range of velocity vectors and pressures frequently results in compromised blade design. For example, a blade that is designed for maximum efficiency under a precise set of flow conditions may not function, or may function with unacceptable results, if that flow condition is changed. If this changed condition is one to which the blade will be subjected, the blade design will be changed to accommodate this additional flow condition. The blade design will be such that it is a compromise between all the flow conditions to which the turbomachine is designed to be subjected.

Even more challenging are the non-uniform axial, radial, and circumferential airflow velocities and pressures that may cause a blade that is operating efficiently over a few degrees of shaft rotation to operate less efficiently at another point of rotation about the shaft.

During operation, deviations between operating conditions and the design parameters reduce the efficiency of the turbine engine and result in localized stall and instable flow and are therefore undesirable. In severe cases, extreme deviations can lead to engine stall or engine surge conditions. It is therefore desirable to provide a turbine engine with a more predictable and uniformly distributed air flow at the turbine engine inlet across a wide range of turbine engine and aircraft operations to increase blade efficiency and increase the stall margin and minimize surge conditions.

Figure 1A:
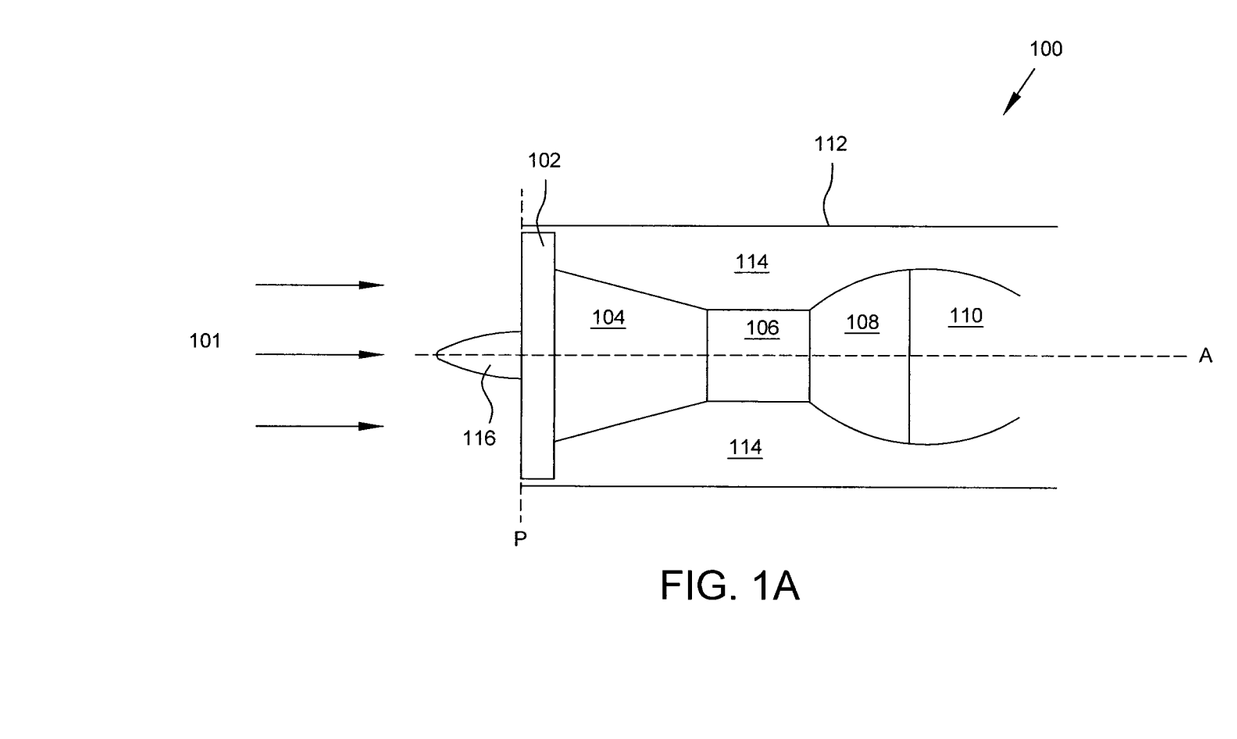
FIG. 1A is a schematic diagram of a turbine engine having a uniformly distributed inlet air flow.

FIG. 1A is a schematic diagram of a turbine engine 100 encountering a uniformly distributed inlet airflow 101. Engine 100 comprises an inlet fan 102, compressor 104, combustor 106, turbine 108, and nozzle 110 disposed about a common axis of rotation A. These components are disposed within an engine casing 112. Some portion of the volume inside the casing 112 may be a bypass flow path 114 which allows some portion of the air passing through the inlet fan 102 to bypass the compressor 104, combustor 106, turbine 108, and nozzle 110. In some embodiments, a nose cone 116 is coupled to the engine 100 axially forward of the inlet fan 102.

The uniformly distributed air flow 101 of FIG. 1A represents the ideal case for a turbine engine 100. The air flow 101 enters the turbine engine 100 at inlet fan 102 having a uniform air speed and direction.

It is preferred that the direction of air flow entering the engine 100 be circumferentially uniform about and along the axis of rotation A and/or normal to a plane P defined by the inlet fan 102 wherein plane P is normal to the axis of rotation A.

Figure 1B:
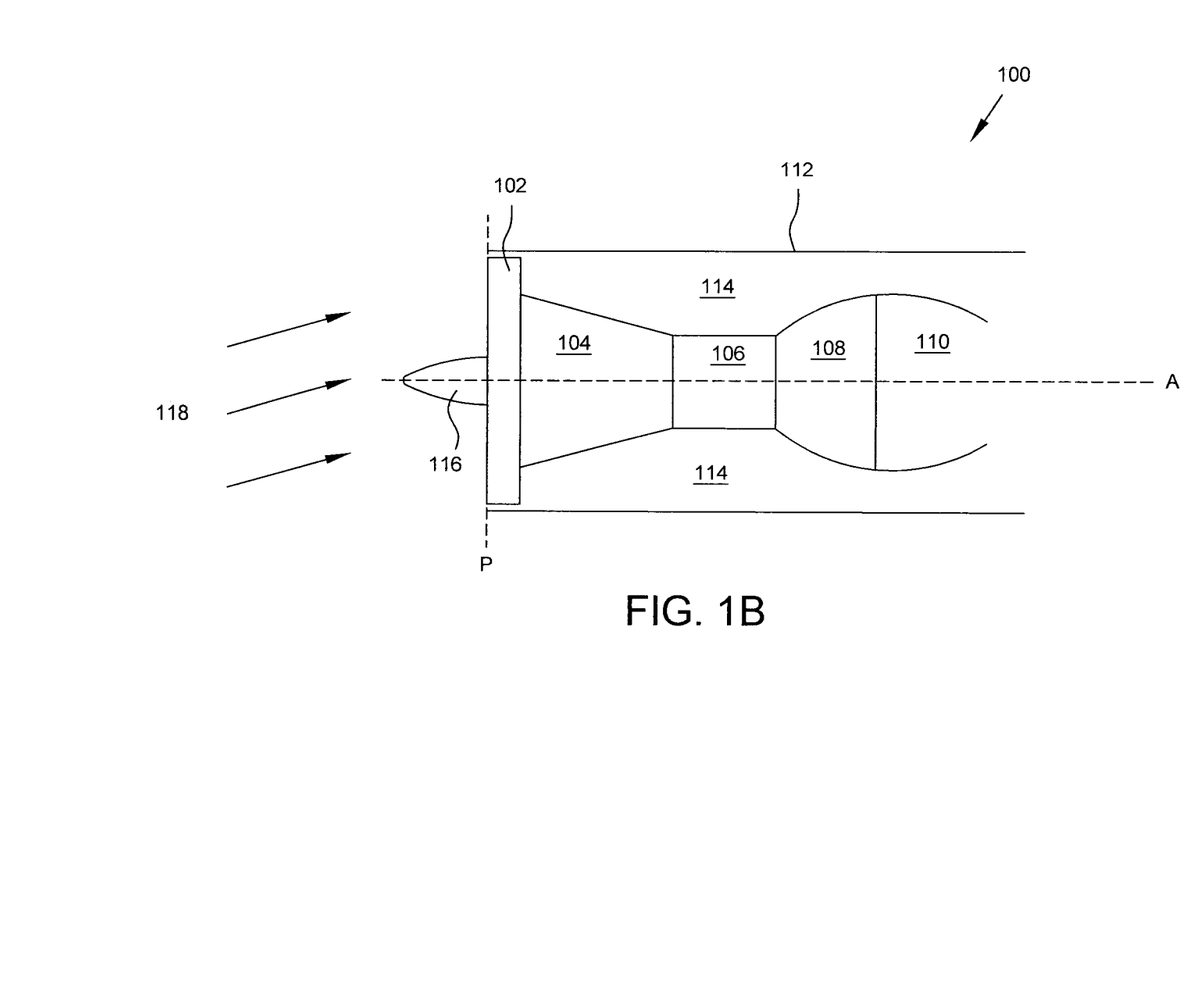
FIG. 1B is a schematic diagram of a turbine engine having an angled uniformly distributed inlet air flow.

In contrast to FIG. 1A, FIG. 1B presents a schematic diagram of an angled uniformly distributed air flow 118 entering turbine engine 100. An angled air distribution has an air direction which is non parallel to an axis of rotation A of the turbine engine 100 and/or normal to a plane P defined by the inlet fan 102 which is normal to the axis of rotation A. An angled uniform airflow 118 may be created, for example, in aviation applications where there is relative movement between the turbine engine 100 and the atmosphere.

Figure 2:
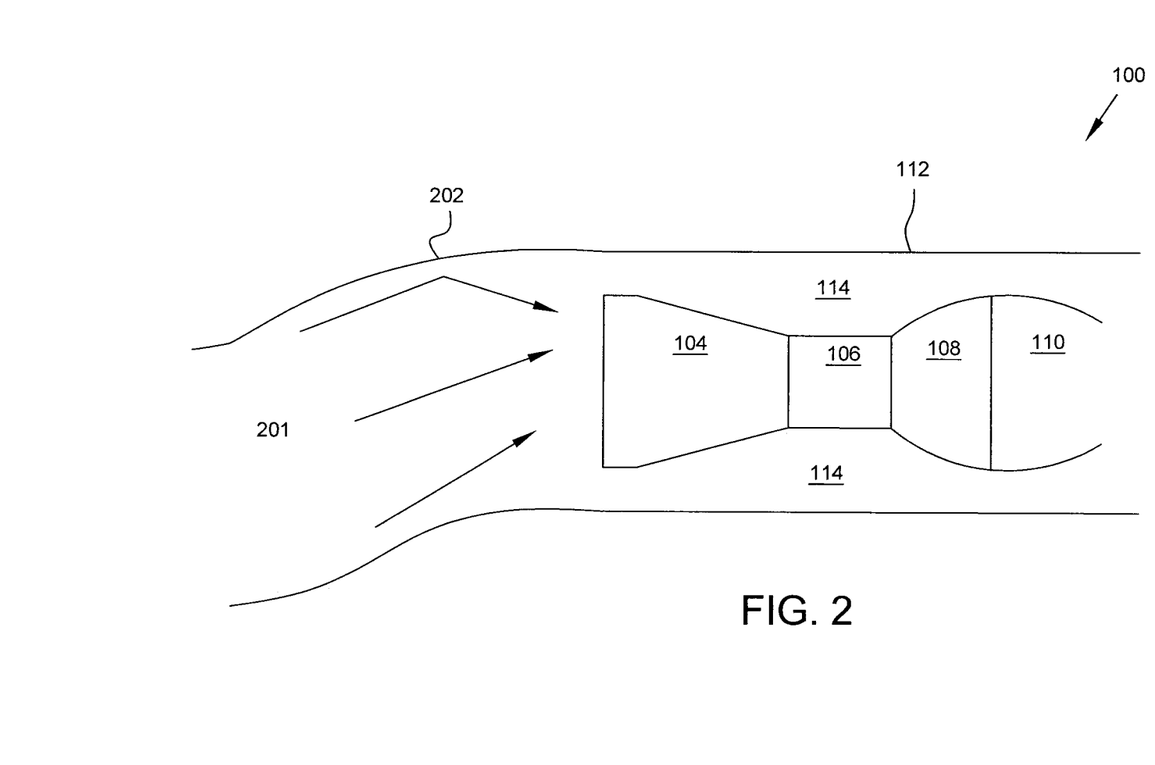
FIG. 2 is a schematic diagram of a turbine engine having a non-uniformly distributed inlet air flow.

In contrast to both FIGS. 1A and 1B, FIG. 2 presents a schematic diagram of a non-uniformly distributed air flow 201. In some cases, a non-uniform air flow 201 may comprise a plurality of air velocity vectors and pressures (not shown. A few of the plurality of air flow vectors are illustrated in FIG. 2. In some embodiments such as that illustrated in FIG. 2, a turbine engine 100 may be disposed downstream of an inlet duct 202, which is coupled to casing 112. Inlet duct 202 is configured to direct air flow to the inlet fan 102 or compressor 104 of the turbine engine 100. Interaction of the air flow with the inlet duct 202 may result in the development of a non-uniform air flow distribution 201 in which the direction and/or magnitude of the velocity vectors are not uniform.

A non-uniform air flow may also be created by the interaction of the airframe or turbine engine casing or housing (particularly the inlet) and the atmosphere (or other fluid), movement of a machine to which the engine is attached, such as, e.g., an airframe, hull, or chassis, relative to the atmosphere, or a combination of these factors.

Figure 3:
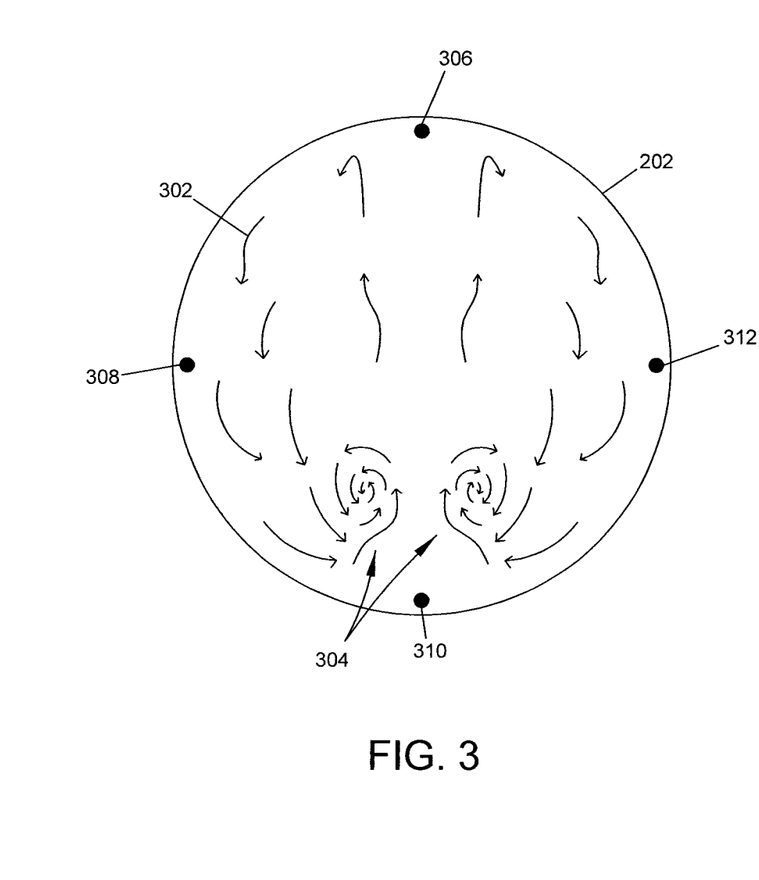
FIG. 3 is an axial schematic view of air flow vectors in a section of turbine engine inlet ducting.

Non-uniform air flow distortions can be quite complex. FIG. 3 is a schematic axial view of the air flow vectors 302 in a portion of inlet duct 202. It should be noted, although not represented in FIG. 3, the flow vectors 302 typically have an axial velocity component. As shown in FIG. 3, complex air flow patterns can develop as air flow interacts with ducting and/or objects in the flow path such as struts. These air flow patterns may include a pair of counter-rotational swirl zones 304 as shown. During aircraft maneuvers, when air enters the duct 202 at vectors oblique to the turbine these air flow patterns may be further complicated. The development of any air flow pattern outside of predicable and uniformly distributed air flow can degrade engine performance.

As can be seen in FIG. 3, a counterclockwise rotating blade will encounter different flow conditions as the blade rotates through positions 306, 308, 310 and 312.

In some embodiments, the non-uniform airflow may result in distortions that are not symmetrical. While the distortions in FIG. 3 show some symmetry about a line half way between the furthest left and furthest right portions of the inlet duct 202, such a symmetry may not always occur with every possible distortion of the airflow. Further complicating engine design, the distortions shown in FIG. 3 can change during operation of the engine.

Figure 4:
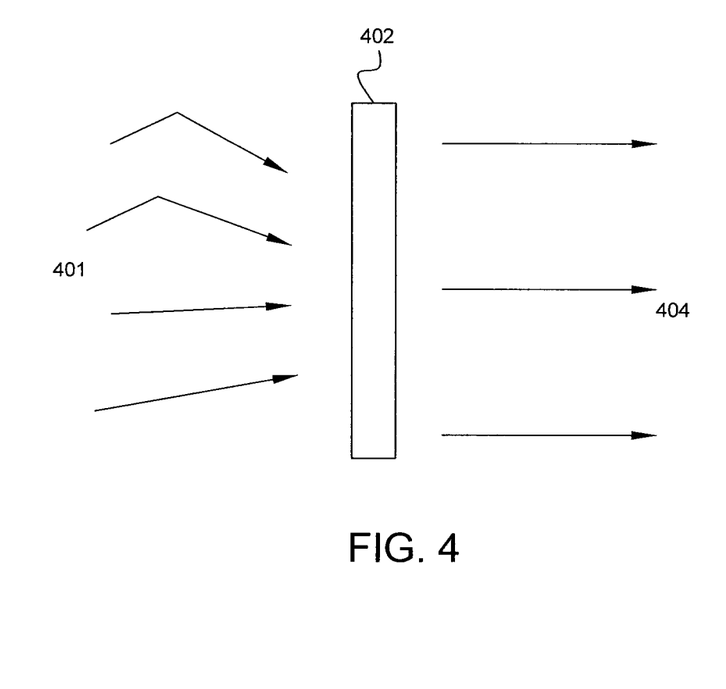
FIG. 4 is a schematic diagram of an airflow control device receiving a non-uniform airflow and exhausting a uniform airflow in accordance with some embodiments of the disclosed subject matter.

Correction of non-uniform air flow distribution is possible using an air flow controller. FIG. 4 is a schematic diagram showing the correction of a non-uniformly-distributed air flow 401 by an air flow controller 402. Air flow 401 incident upon the controller 402 at an angle passes through the controller 402 and exits as uniformly-distributed air flow 404.

Figure 5:
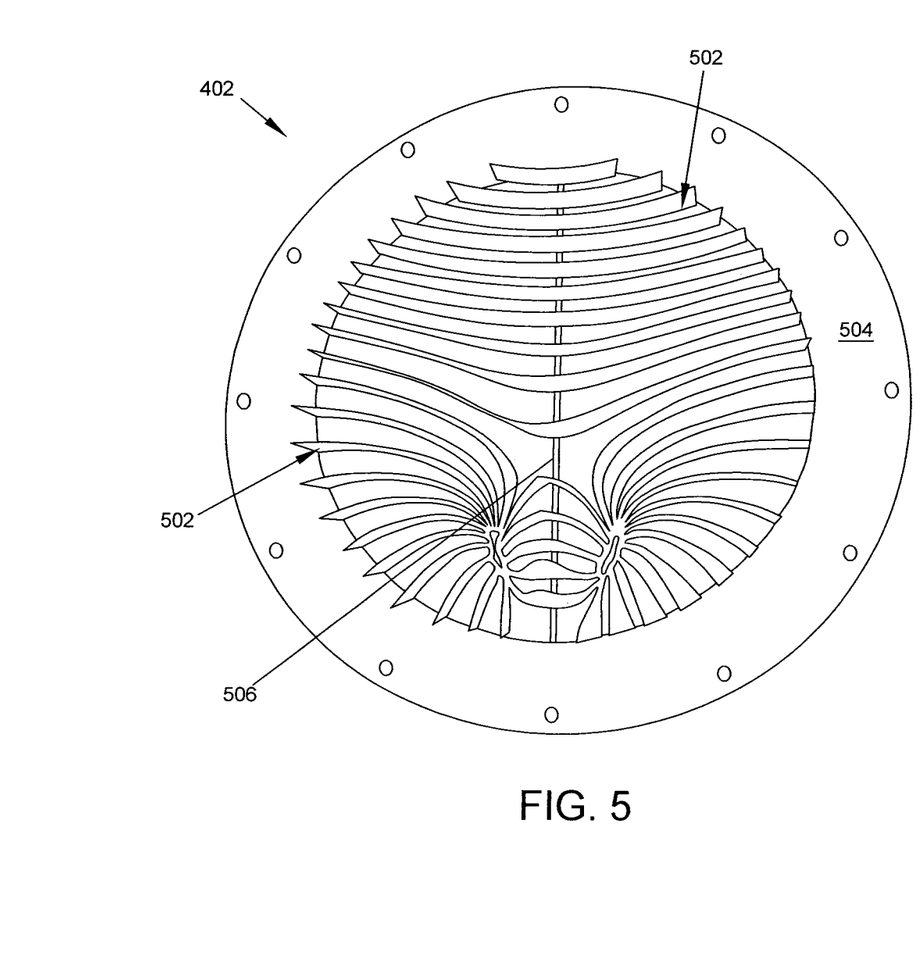
FIG. 5 is a perspective view of an airflow control device in accordance with some embodiments of the disclosed subject matter.

FIG. 5 is a perspective view of a controller 402 in accordance with some embodiments of the disclosed subject matter. In some embodiments, controller 402 comprises a plurality of vanes 502 extending across a frame 504 which is configured to be mounted axially forward of the compressor or other turbomachinery in the turbine engine 100. The frame 504 may comprise a ring with a plurality of holes or other features for mounting the vanes 502 to the frame 504, a support beam 506 extending across the ring, and a plurality of vanes 502 arranged to exhaust a uniformly distributed air flow. In some embodiments the controller 402 comprises a central aperture (not shown) configured to accommodate a nose cone 116 or a turbine shaft.

In some embodiments the vanes 502 of the controller 402 are formed from a shape-memory material. In some embodiments, wires or other conductive members are embedded in one or more of the vanes 502 and coupled to a control system. Application of electrical current to the wires or other conductive members controls the temperature of the vanes 502. The temperature causes changes to the shape of the shape-memory material. Thus, through the application or non-application of electrical current the control system may generally determine some aspect of the shape of vanes 502.

Air flow distortion patterns at the engine inlet and other locations can be modeled or experimentally derived for a wide range of operating conditions (i.e. altitude, velocity, maneuvering and rates of maneuvering, etc.) for specific engine and airframe (or other vehicle) designs. The control system can adjust the shape of vanes 502 to improve air flow distribution based on the operating conditions of the aircraft. Although truly uniform air flow distribution may not be possible to achieve across all operating conditions, any improvement in the uniformity of air flow distribution improves the engine efficiency, margins to stall or surge or both.

Figure 6:
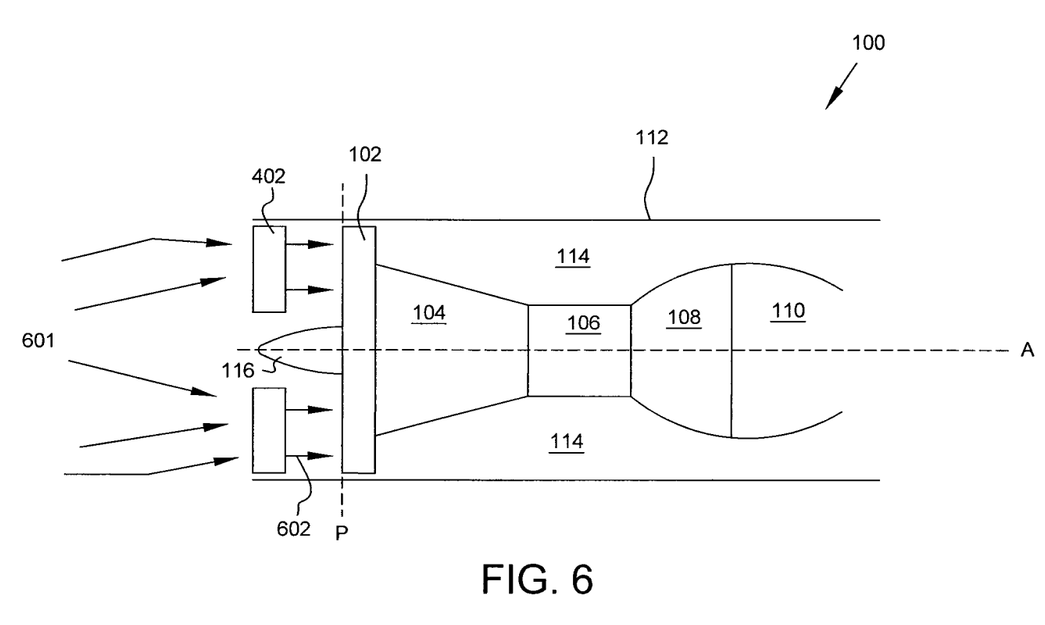
FIG. 6 is a schematic diagram of an airflow control device coupled to a turbine engine, the airflow control device receiving a non-uniform airflow and exhausting a uniform airflow in accordance with some embodiments of the disclosed subject matter.

FIG. 6 is a schematic diagram of an airflow control device 402 coupled to a turbine engine 100, the airflow control device 402 receiving an non-uniform airflow 601 and exhausting a uniform airflow 602 in accordance with some embodiments of the disclosed subject matter. As discussed above, the uniform airflow 602 may be entirely uniform or simply more uniform in its distribution and set of velocity vectors than non-uniform airflow 601. In the embodiment of FIG. 6, vanes 502 (not shown) of the controller 402 are aligned to re-direct the non-uniform airflow 601 in various directions to achieve a more uniform circumferential flow. As a result of this conditioning of the inlet air flow, uniform airflow 602 enters the compressor 104 having a more desirable distribution and set of velocity vectors.

Figure 7:
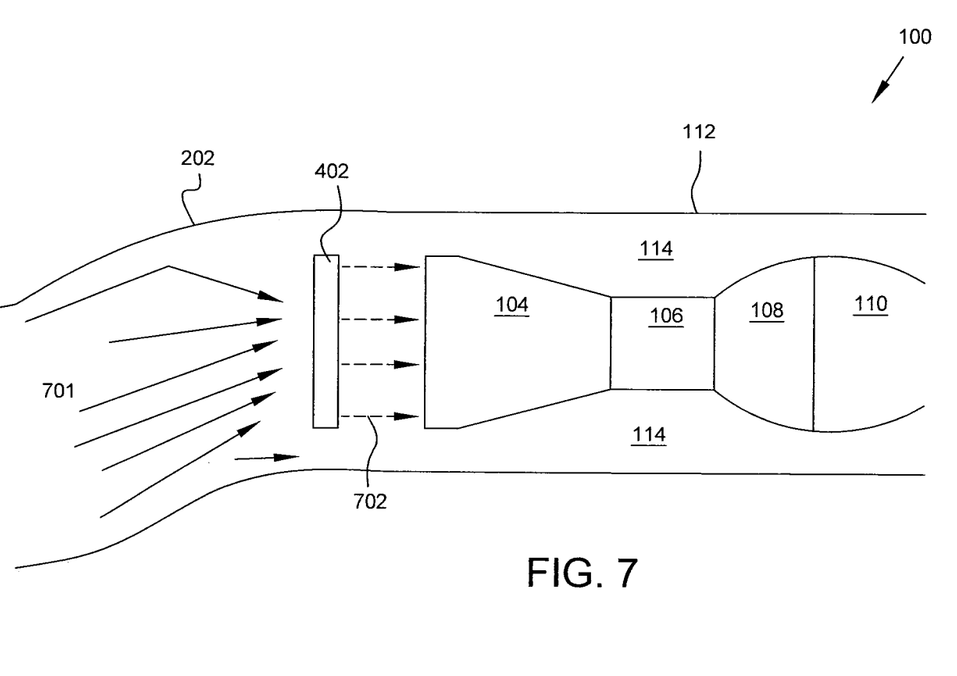
FIG. 7 is a schematic diagram of an airflow control device disposed in the inlet ducting of a turbine engine, the airflow control device receiving a non-uniform airflow and exhausting a uniform airflow in accordance with some embodiments of the disclosed subject matter.

FIG. 7 is a schematic diagram of an airflow control device 402 disposed in the inlet ducting 202 of a turbine engine 100, the airflow control device 402 receiving a non-uniform airflow 701 and exhausting a uniform airflow 702 in accordance with some embodiments of the disclosed subject matter. In the embodiment of FIG. 7, vanes 502 of the controller 402 are aligned to re-direct non-uniform airflow 701 to a direction which is parallel the axis of rotation A. As a result of this conditioning of the inlet air flow, air 702 exiting the controller 402 is uniformly distributed as it enters the compressor 104 and bypass flow path 114.

The scenarios presented in FIGS. 6 and 7 are simplified for the schematic diagram. In operation, air flow controller 402 may not be capable of achieving a truly uniform air flow distribution. Instead, air flow controllers 402 of the disclosed subject matter seek to improve upon the non-uniform air flow distributions in order to provide a more uniformly distributed air flow at the inlet of a turbine engine or other turbomachinery. In doing so, air flow controllers 402 improve engine efficiency and increase margin to stall or surge.

Figure 8:
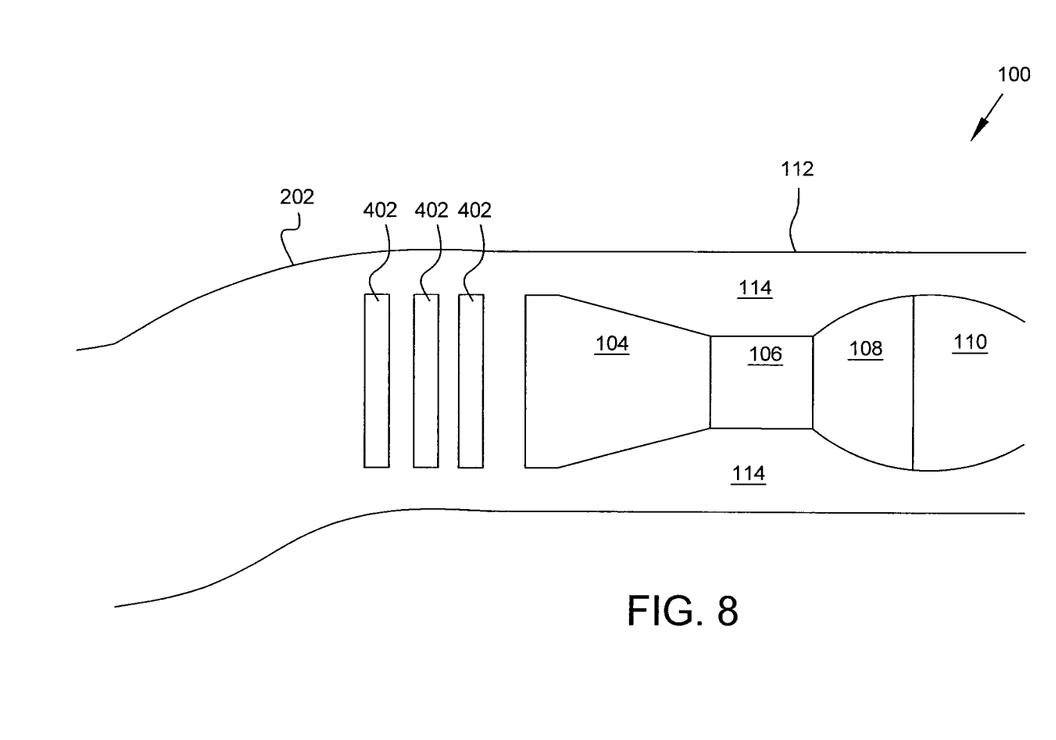
FIG. 8 is a schematic diagram of a plurality of airflow control devices disposed in the inlet ducting of a turbine engine in accordance with some embodiments of the disclosed subject matter.

FIG. 8 is a schematic diagram of a plurality of airflow control devices 402 disposed in the inlet ducting 202 of a turbine engine 100 in accordance with some embodiments of the disclosed subject matter. In some embodiments air flow controllers 402 may be "stacked" by providing more than one controller 402 in a duct 202. As a result, air flow may be sequentially treated by each of the controllers 402. In some embodiments, a first controller 402 is configured to reduce air flow distortions of a first type, while a second controller 402 is configured to reduce air flow distortions of a second type. In some embodiments, multiple controllers 402 may be utilized to correct more dramatic distortions, or provide more efficient or effective corrections to air flow distortions.

Figure 9A:
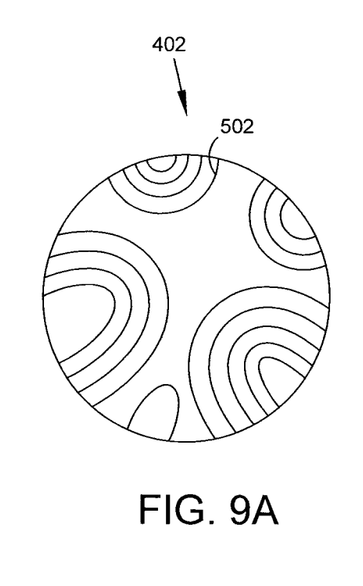
FIG. 9A is an axial profile view of an airflow control device in accordance with some embodiments of the disclosed subject matter.
Figure 9B:
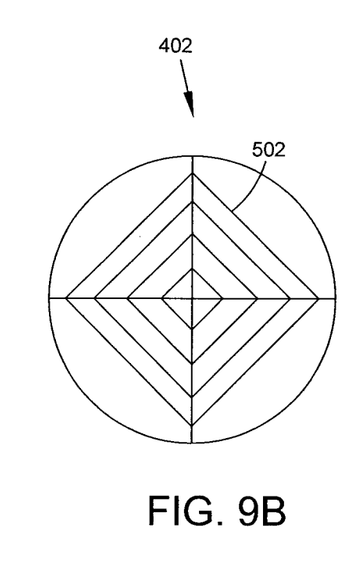
FIG. 9B is an axial profile view of an airflow control device in accordance with some embodiments of the disclosed subject matter.
Figure 9C:
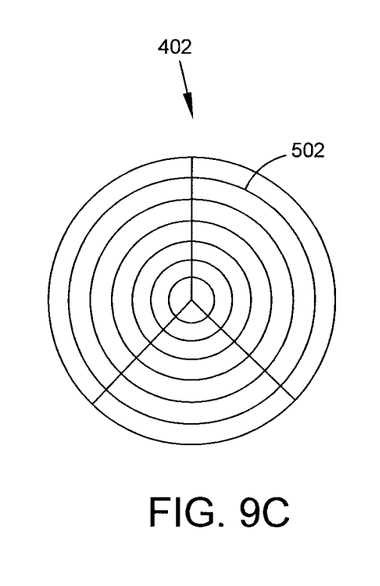
FIG. 9C is an axial profile view of an airflow control device in accordance with some embodiments of the disclosed subject matter.

FIG. 9A is an axial profile view of an airflow control device 402 in accordance with some embodiments of the disclosed subject matter. FIG. 9B is an axial profile view of an airflow control device 402 in accordance with some embodiments of the disclosed subject matter. FIG. 9C is an axial profile view of an airflow control device 402 in accordance with some embodiments of the disclosed subject matter. As shown in FIGS. 9A, 9B and 9C, in some embodiments the vanes 502 of the controllers 402 are configured to address a specific type of air flow distortion. For example, the vanes 502 depicted in FIG. 9A may be configured to improve, prevent, or correct distortions from air flow swirl patterns that develop in an inlet duct 202. Conversely, the vanes 502 of FIGS. 9B and 9C may not be disruptive to any specific air flow distortion, but are rather configured to improve uniformity of distribution. In embodiments where the controller 402 is coupled to a control system, the embodiment of FIG. 9B may allow for selective positioning of vanes 502 by sector of the controller 402 and/or by individual vane 502.

The disclosed subject matter additionally provides methods of controlling or correcting detrimental air flow distortions at the inlet of a turbine engine. In some embodiments distortions in the inlet air flow are first determined. These distortions may be determined using direct measurement, for example using one or more sensors in the inlet duct to measure non-uniformity of the inlet air flow distribution. In some embodiments, these inlet air flow distortions are determined by calculations, using as their input various indirectly measured engine performance parameters. In some embodiments, modeling may predict an air flow condition within an inlet duct or elsewhere in or at the inlet of the engine based on the vehicle parameters such as, e.g., altitude, proximity to other objects, yaw, roll, or climb rate.

Once the anticipated inlet air flow distortions are determined, one or more corrective vanes of a controller, or conditioner, may be added to the air flow path, such that the flow of air over the one or more vanes conditions the air flow to improve uniformity of distribution.

In some embodiments, the one or more vanes may be adjusted or repositioned based on the originally determined distortion or an updated distortion. Such adjustments may be made to the vanes where the vanes are formed from a shape memory material with an embedded conductive member. By applying electrical current to the conductive member, the vanes may be heated and therefore deformed and assume an altered positioning.

In some embodiments, an air flow controller is adapted to be coupled axially forward of a high Mach capable engine which operates over a wide range of inlet flow temperatures due to aerothermal heating. The aerothermal heating at high Mach numbers can provide inlet air temperatures in excess of 1,000 degrees, thus generating far different flow fields than when the engine is operated at subsonic conditions. In such embodiments, an air flow controller may be provided of shape memory material that self-adjusts based on the inlet temperatures caused by aerothermal heating, with no control system input or electrical heating required.

Figure 10:
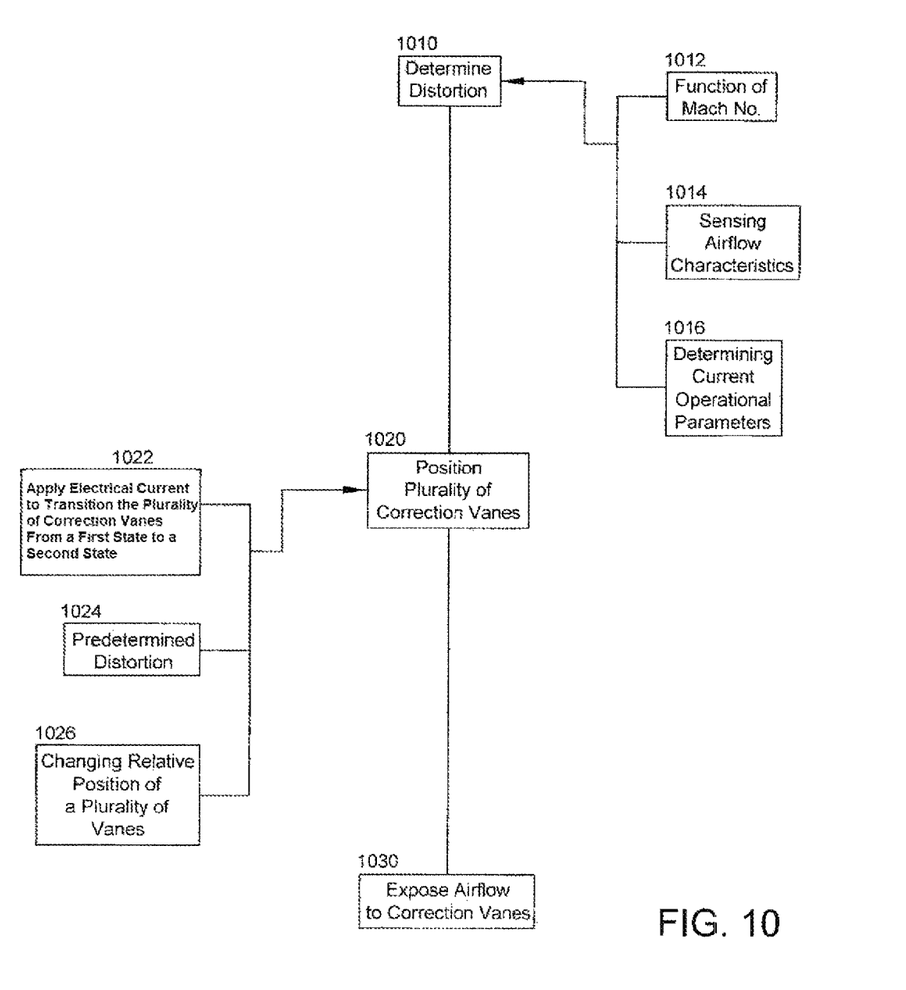
FIG. 10 is a flow chart a method of adaptively removing the distortions prior to the compressor stage according to an embodiment of the disclosed subject matter.

FIG. 10 illustrates a method 1000 for adaptively removing the distortions prior to the compressor stage. A distortion of the airflow within the inlet is determined in Block 1010. This determination may be predetermined as a function of Mach number as shown in Block 1012. In predetermining the distortion, empirical simulations or experimental information may advantageously be used. The distortion may also be determined by sensing the airflow characteristics historically or in real time as shown in Block 1014. It is also envisioned that the distortion may be determined as a function of operational parameter of the engine and/or the aircraft as shown in Block 1016. The operational parameters of the engine may include throttle, thrust, rpms, temperatures, and pressures etc. The operation parameters of the aircraft may include angle of attack, turning, climb, roll, yaw, pitch, thrust, altitude, attitude and velocity.

As shown in Block 1020 the plurality of correction vanes are positioned to mitigate the determined distortion in the airflow. In embodiments of the disclosed subject matter the correction vanes are adjusted by applying electrical current through vanes constructed with shape memory material as shown in Block 1022. In other embodiments, the positioning is predetermined based on an expected distortion that has also be predetermined, as shown in Block 1024. Embodiments in which a plurality of conditioning grids are longitudinally spaced apart, the positioning may be accomplished by rotation and/or axial separation of the plurality of conditioning grids relative to one another as shown in Block 1026.

The distorted flow is then exposed to the correction vanes as shown in Block 1030. It should be understood that the determination, positioning and exposing steps may be iterative in nature. In an iterative embodiment, direct sensors located downstream of the conditioning grid, or performance parameters of the turbine may be used as feedback in assessing the efficacy of the conditioning and determining subsequent repositioning of the vanes and/or grid. The feedback information may be advantageously collected in a database to further refine the positioning of the vanes and assist in development in historical data for use in subsequent designs.

The systems and methods of conditioning inlet air flow disclosed herein provide several advantages over the prior art. Most significantly, the disclosed air flow controller improves the uniformity of air flow at the inlet of a turbine engine, thus improving engine efficiency and margin to stall or surge conditions. The disclosed systems and methods carry a relatively low weight penalty, while providing greatly improved engine performance. Some of the improved engine performance gains may occur at off-design conditions, design conditions, or both.

Although examples are illustrated and described herein, embodiments are nevertheless not limited to the details shown, since various modifications and structural changes may be made therein by those of ordinary skill within the scope and range of equivalents of the claims.

What is claimed is:

1. In a turbine engine having an air inlet duct prior to a compressor stage, wherein airflow distortions are caused at least in part by an interaction of the airflow with the air inlet duct, a method of adaptively removing the airflow distortions prior to the compressor stage comprising:
   determining a distortion in the airflow;
   positioning a plurality of correction vanes disposed within an annular frame of an air flow controller based at least upon the determined distortion; and
   exposing the airflow to the plurality of correction vanes, wherein the plurality of correction vanes comprises a plurality of shape memory materials;
   wherein the positioning the plurality of correction vanes comprises applying an electrical current to at least one respective correction vane of the plurality of correction vanes, wherein the application of electrical current transitions the at least one respective correction vane of the plurality of correction vanes from a first state to a second state,
   wherein the determining the distortion comprises sensing airflow characteristics in the air inlet duct, the airflow characteristics including air flow swirl patterns developing in the air inlet duct,
   wherein, in the second state, the plurality of correction vanes are positioned so as to be asymmetrical about a first diametric central axis extending across the annular frame so as to improve, prevent, or correct the airflow distortions caused by the air flow swirl patterns, and
   wherein, in the second state:
      the plurality of correction vanes includes at least four sections of semi-circular correction vanes; and each section of semi-circular correction vanes includes concentric correction vanes that each extend away from an annular outer edge of the annular frame towards a center of the annular frame.

2. The method of claim 1, wherein the determining the distortion comprises determining current operational parameters of the turbine engine.

3. The method of claim 2, wherein the current operational parameters are selected from a group consisting of angle of attack, turning, climb, roll, yaw, pitch, altitude, and attitude.

4. The method of claim 2, wherein the current operational parameters are selected from a group consisting of takeoff, landing, cruise, and loiter.

5. The method of claim 1, wherein the turbine engine includes an air passage defined by the air inlet duct, the air passage having a center path defining the airflow through the air inlet duct, and wherein the center path comprises at least one curve.

6. The method of claim 1, wherein the positioning is performed in real time.

7. The method of claim 1, wherein the plurality of correction vanes are positioned at two longitudinal displaced stations within the air inlet duct.

\* \* \* \* \*